(12) United States Patent
Fodor et al.

(10) Patent No.: US 10,440,552 B2
(45) Date of Patent: *Oct. 8, 2019

(54) METHOD AND APPARATUS FOR COOPERATIVE POSITIONING IN A WIRELESS COMMUNICATION NETWORK

(71) Applicant: Telefonaktiebolaget LM Ericsson (publ), Stockholm (SE)

(72) Inventors: Gabor Fodor, Hässelby (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/668,806

(22) Filed: Aug. 4, 2017

(65) Prior Publication Data

US 2017/0359713 A1 Dec. 14, 2017

Related U.S. Application Data

(63) Continuation of application No. 14/442,545, filed as application No. PCT/SE2013/050338 on Mar. 26, 2013, now Pat. No. 9,756,493.

(51) Int. Cl.
*H04W 8/00* (2009.01)
*H04W 24/04* (2009.01)
(Continued)

(52) U.S. Cl.
CPC .......... *H04W 8/005* (2013.01); *G01S 5/0205* (2013.01); *G01S 5/0236* (2013.01); *G01S 5/0284* (2013.01);
(Continued)

(58) Field of Classification Search
CPC ....... H04W 24/04; H04W 4/023; H04W 4/22; H04W 64/00; H04W 4/90
USPC ..................................................... 455/404.1
See application file for complete search history.

(56) References Cited

U.S. PATENT DOCUMENTS 8,219,121 B2  7/2012  Sim et al.
9,756,493 B2 * 9/2017  Fodor ................... H04W 4/023
(Continued)

FOREIGN PATENT DOCUMENTS

WO  2009064751 A2  5/2009
WO  2012114160 A1  8/2012
WO  2012114161 A1  8/2012

OTHER PUBLICATIONS

3GPP, "3rd Generation Partnership Project; Technical Specification Group SA; Feasibility Study for Proximity Services (ProSe) (Release 12)", 3GPP TR 22.803 V1.0.0, Aug. 2012, 1-33.
(Continued)

*Primary Examiner* — Michael R Neff
(74) *Attorney, Agent, or Firm* — Sage Patent Group

(57) ABSTRACT

According to the teachings herein, a wireless device that is a candidate for operating in the cooperative positioning advantageously activates that mode in response to detecting a warning situation. In some embodiments, the detection and/or activation operations are autonomously undertaken by the wireless device. In other embodiments, the wireless communication network provides warning situation detection and/or control of the cooperative positioning mode. More generally, the wireless communication network maintains a database identifying those wireless devices within a given service area that are cooperative positioning mode candidates—e.g., the devices having D2D communication capability and operational configurations that allow such operation. By the network providing such information in advance of a warning situation, the candidate devices have the information needed to efficiently discover or otherwise identify other such candidates.

17 Claims, 6 Drawing Sheets

(51) Int. Cl.
  *H04W 64/00* (2009.01)
  *G01S 5/02* (2010.01)
  *H04W 4/02* (2018.01)
  *H04W 40/24* (2009.01)

(52) U.S. Cl.
  CPC ........... *H04W 4/023* (2013.01); *H04W 24/04* (2013.01); *H04W 40/246* (2013.01); *H04W 64/00* (2013.01)

(56) References Cited

U.S. PATENT DOCUMENTS

| | | |
|---|---|---|
| 2004/0214584 A1 | 10/2004 | Marinier |
| 2009/0131021 A1 | 5/2009 | Vogedes et al. |
| 2009/0305708 A1 | 12/2009 | Matsui et al. |
| 2013/0089020 A1 | 4/2013 | Hakola et al. |
| 2013/0143591 A1 | 6/2013 | Silny et al. |
| 2013/0288668 A1* | 10/2013 | Pragada ................ H04W 12/06 455/426.1 |
| 2015/0264554 A1 | 9/2015 | Addepalli et al. |

OTHER PUBLICATIONS

3GPP, "3rd Generation Partnership Project; Technical Specification Group Services and System Aspects; Public Warning System (PWS) requirements (Release 12)", 3GPP TS 22.268 V12.0.0, Sep. 2012, 1-15.
Fodor, GáBOR et al., "Design Aspects of Network Assisted Device-to-Device Communications", IEEE Communication Magazine, Mar. 2012, pp. 170-177.

* cited by examiner

METHOD AND APPARATUS FOR COOPERATIVE POSITIONING IN A WIRELESS COMMUNICATION NETWORK

RELATED APPLICATIONS

This application is a continuation of U.S. application Ser. No. 14/442,545, filed 13 May 2015, which is a U.S. National Phase Application of PCT/SE2013/050338 filed 26 Mar. 2013. The entire contents of each of the aforementioned applications are incorporated herein by reference.

TECHNICAL FIELD

The present invention generally relates to wireless communication networks, and particularly relates to cooperative positioning in such networks.

BACKGROUND

Public Land Mobile Networks (PLMNs) represent one example of the types of communication networks that can and do play a valuable role in public safety and information dissemination. For example, Release 8 of the Third Generation Partnership Project (3GPP) specifications provides for wireless system parts and associated system protocols referred to as the "Earthquake and Tsunami Warning System" or ETWS. The ETWS addresses a number of disaster situations and operates with the goal of collecting seismic sensor or other threat information and relaying to emergency points or other alert system nodes, for distribution to wireless devices. Release 9 included provisions for a Commercial Mobile Alert System (CMAS), which is designed to distribute alert signals to cellular users operating within the coverage area(s) of a cellular system. Further, the reader may refer to the 3GPP document "Technical Specification TS 22.268," for details regarding the current state of the art for the 3GPP Public Warning System.

However, in a disaster or other type of national security or public safety (NSPS) situation, all or part of the cellular and local wireless network infrastructure may be impaired, e.g., may become damaged or otherwise become dysfunctional. Such infrastructure impairment degrades or eliminates communication services, at least within the affected areas. Further, the impairment of network infrastructure can result in unreliable and/or imprecise operation of the cellular location services (LCS) broadly relied upon for determining the geographic position of wireless devices operating within the network. The degradation or outright loss of reliable, accurate device positioning in NSPS situations has serious, potentially lethal consequences.

An example of such a situation is when a user equipment or "UE" loses cellular and wireless local network coverage and it does not have its own mechanism for determining its location, or is operating in an enclosed space or other environment where its onboard positioning system operates poorly or not at all. Device-based location mechanisms include Global Navigation Satellite System (GNSS) circuits, such as a Global Positioning System (GPS) circuitry, Galileo-based circuitry, etc. Such systems may use network assistance, e.g., Assisted GNSS (A-GNSS) and thus are vulnerable to a loss of assistance data arising from impairment of the network infrastructure, or arising from movement of the device into a location that prevents the reliable reception of the assistance data.

The impairment of network-provided and/or network-assisted positioning, broadly referred to as "infrastructure based positioning" to denote the reliance on the network for device positioning, at best leaves the device owner or operator with an unreliable estimate of the device's position. At worst, the device owner or operator is left without any positioning information. Here, the phrase "device owner or operator" denotes any person, machine or system that uses or includes a wireless communication device for communication network services, including LCS. Non-limiting examples of such devices include feature phones, smartphones, machine type communication devices or machine-to-machine (M2M) communication devices, target devices, embedded or integrated devices, USB-dongles, network modems or other wireless adaptors, in-vehicle communication modules, etc.

Further, there are many types and/or variations of "infrastructure based positioning." One example is the aforementioned A-GNSS approach. Other examples include Observed Time Difference of Arrival (OTDOA) positioning methods, Uplink Time Difference of Arrival (UTDOA) positioning methods, enhanced Cell ID (E-CID) based positioning methods, and various hybrid methods, such as a combination of A-GNSS and OTDOA-based measurements. These techniques implicate any number of network infrastructure entities beyond the base stations and their backhaul and sidehaul links, such as Location Measurement Units (LMUs) serving as measurement nodes for uplink signals from wireless devices operating within the network, or, in the case of Long Term Evolution (LTE) networks, one or more Enhanced Serving Mobile Location Centers (E-SMLCs).

Against this backdrop, the 3GPP SA1 working group is studying the feasibility of Proximity Services (ProSe) for national security and public safety use cases. Refer, for example, to the technical report, 3GPP TR 22.803 "Proximity Services (ProSe)". Such proximity services can be provided by direct device-to-device (D2D) communications, in which two or more devices communicate via a direct communication link, rather than communicating through a cellular base station (BS) or a wireless local area network (WLAN) access point (AP) or a relay. In the LTE context, this type of communication is referred to as "LTE Direct."

Because D2D communications utilizing LTE Direct or some other ad hoc networking technology, such as Bluetooth or WiFi Direct, can take place even with limited or no infrastructure support, it is identified as an important technology enabler for ProSe in a catastrophe or other emergency situations.

However, peer-to-peer cooperative positioning methods, in which peer wireless devices exchange positioning information to determine and/or refine their respective positioning determinations, generally still rely on the availability of cellular or WLAN access points with respect to at least some of the peer devices involved in cooperative positioning. For example, wireless devices operating in a GNSS-hostile environment (e.g., indoors) or devices without GNSS capability receive peer positioning information from one or more other wireless devices that know their absolute positions as a consequence of network-assisted or network-performed positioning. LTE Direct or other D2D communication within the cellular network radio spectrum may be used for D2D communications, for peer-based device positioning, communication with proximate first responders, etc.

Known approaches to implementing D2D communications consider radio resource availability, network load, radio propagation conditions, and other physical and lower-layer parameters. In general, the current algorithms used for activating D2D communications tend to select devices for D2D communications based on minimizing the interference caused by such devices, which results in the selection of devices that are more distant from the cellular base stations and/or other wireless access points. However, it is recognized herein that such approaches do not consider the various degradations in infrastructure positioning accuracy and reliability that may occur with even a partial impairment of network infrastructure.

SUMMARY

According to the teachings herein, a wireless device that is a candidate for operating in the cooperative positioning advantageously activates that mode in response to detecting a warning situation. In some embodiments, the detection and/or activation operations are autonomously undertaken by the wireless device. In other embodiments, the wireless communication network provides warning situation detection and/or control of the cooperative positioning mode. In at least one embodiment, the wireless communication network maintains a database identifying those wireless devices within a given service area that are cooperative positioning mode candidates. By the network providing such information in advance of a warning situation, the candidate devices have the information needed to efficiently discover or otherwise identify other such candidates.

In an example implementation, a network node, such as a base station or a positioning node in a wireless communication network, is configured to carry out a method that includes detecting a warning situation that is associated with actual or expected impaired operation of the wireless communication network. The warning situation will be understood as applying to one or more service areas of the network and the method further includes identifying wireless devices in the service area(s) that are candidates for operating in a cooperative positioning mode, for performing device positioning, and sending a message to the identified wireless devices, to activate the cooperative positioning mode.

For example, the message indicates the warning situation and the wireless devices autonomously activate the cooperative positioning mode responsive to the indication, or the message includes an explicit command to activate the cooperative positioning mode. The network node also may be configured to "bootstrap" the activation of cooperative positioning mode by the candidate wireless devices, based on transmitting signaling that identifies those devices within the service area(s) that are candidates for operating in the cooperative positioning. By having this information in advance of an actual or expected warning situation, a given candidate device can more easily discover or otherwise identify neighboring candidate devices, once it activates the cooperative positioning mode.

Regarding device-side aspects of the teachings herein, an example wireless device is configured to perform a method that includes detecting a warning situation that is associated with actual or expected impaired operation of the wireless communication network within a current service area of the wireless device, and activating a cooperative positioning mode that relies on exchanging positioning information with other wireless devices using D2D communications. The example method further includes detecting one or more other wireless devices in the service area that are candidates for engaging in cooperative positioning with the wireless device, performing cooperative positioning in conjunction with one or more of the detected wireless devices. As noted earlier, the detecting step may be aided or otherwise bootstrapped by information received from the wireless communication network in advance of the warning situation, where such information identifies the other devices within the service area that are candidates for operating in the cooperative positioning mode.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
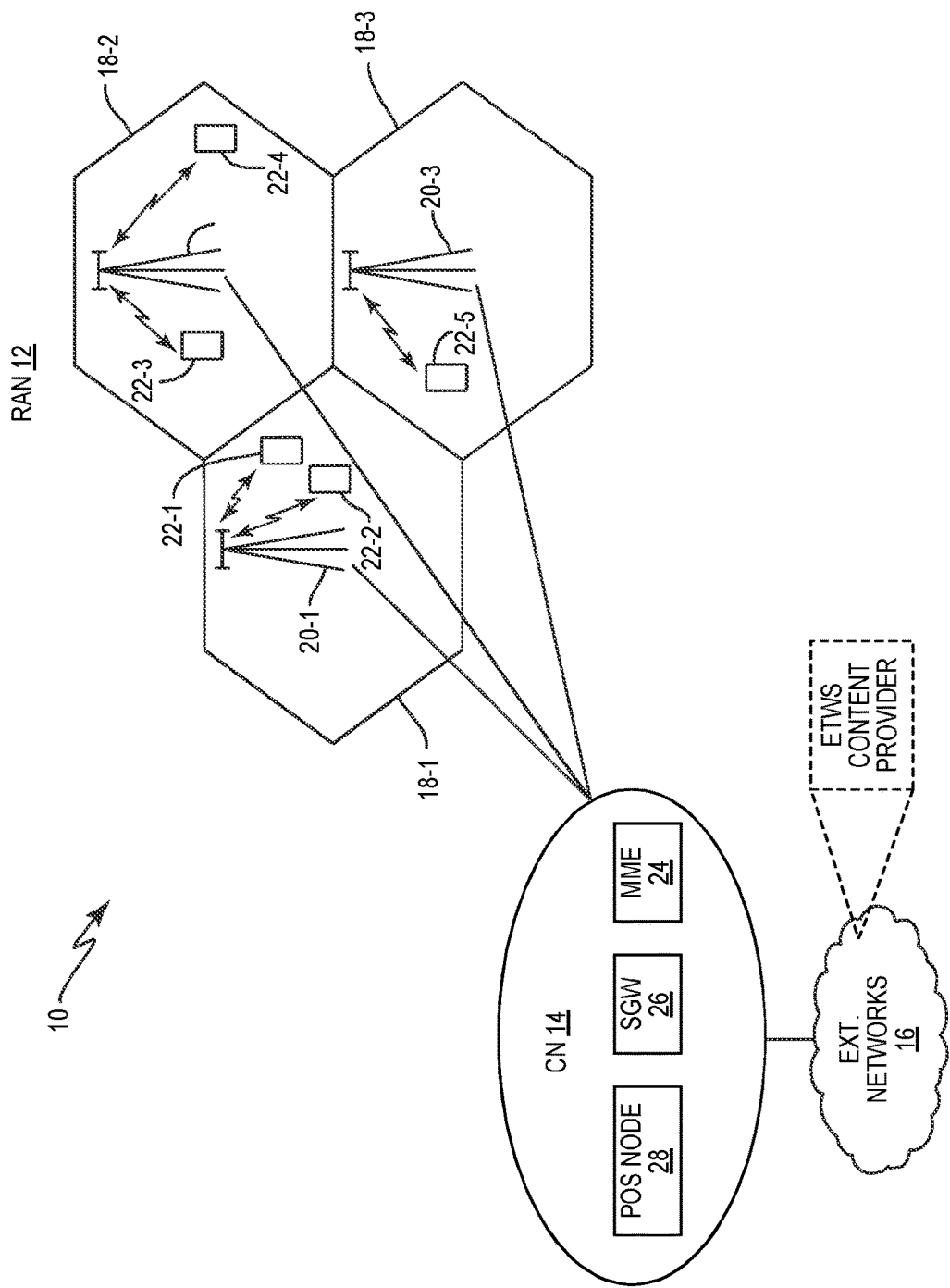
FIG. 1 is a block diagram of one embodiment of a wireless communication network that includes one or more nodes configured according to the teachings herein.

FIG. 1 illustrates one embodiment of a wireless communication network 10, including a Radio Access Network (RAN) portion 12 and a Core Network (CN) portion 14 that communicatively couples with one or more external networks 16. While not the only contemplated mechanism for detecting actual or impending warning situations, it will be understood that Emergency Threat Warning System (ETWS) messages and/or other warning information may be received via the external networks 16.

The RAN 12 includes one or more cells 18 and corresponding base stations 20 that provide communication services in those cells 18—these cells 18 or combinations of them may be more generally referred to as "service areas 18." Where suffixing aids clarity, the service areas 18 may be referred to as service area 18-1, 18-2, and so on. Likewise, if needed for clarity, the base stations 20 may be referred to as base station 20-1, 20-2, and so on. Each base station 20 supports communication services for wireless devices 22 operating in the service area(s) 18 associated with that base station 20. Where needed for clarity, individual wireless devices 22 may be referred to as wireless device 22-1, 22-2, and so on.

One also sees that the CN 14 includes a few example nodes, such as a Mobility Management Entity (MME) 24, a Serving Gateway (SGW) 26, and a positioning node 28. In an LTE-based embodiment of the network 10, the positioning node 28 may be an Enhanced Serving Mobile Location Center or E-SMLC. In that case, the E-SMLC is connected to an LTE base station (i.e., eNode B) via an interface which uses LTE positioning protocol annex (LPPa). The E-SMLC communicates with a wireless device 22 directly via LTE positioning protocol annex (LPP), which is transparent to LTE base stations, including the serving base station 20 of the wireless device 22.

Figure 2:
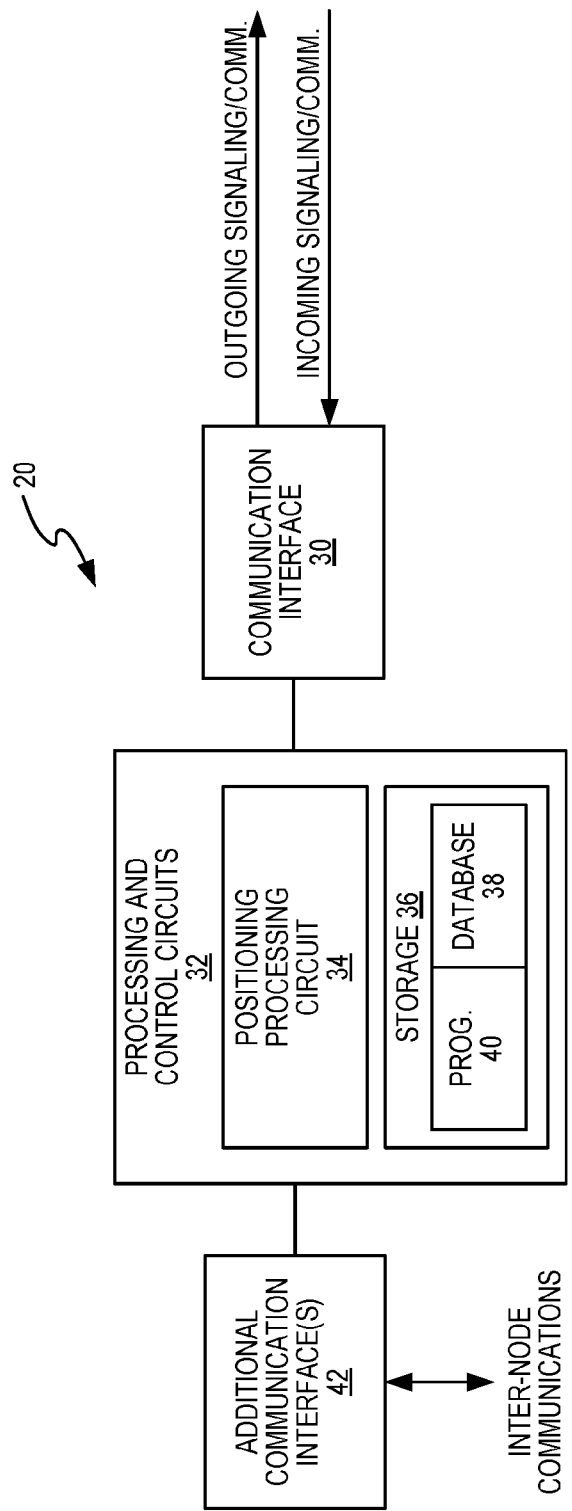
FIG. 2 is a block diagram of one embodiment of a radio base station, such as may be used in the wireless communication network introduced in FIG. 1.

FIG. 2 illustrates a base station 20 as one non-limiting example of the type of network node that may be configured to support the network-side teachings herein. The illustrated base station 20 includes a communication interface 30, e.g., for communicating with wireless devices 22 using radio resources. The base station 20 further includes processing and control circuits 32, which include a positioning processing circuit 34 and include or are associated with one or more storage elements 36 that store, e.g., database information 38 and/or a computer program 40. The base station 20 further includes one or more additional communication interfaces 42, e.g., for communication with the CN 14 and/or with other base stations 20.

In more detail, in one or more embodiments, the communication interface 30 is configured for sending signals to wireless devices 22 and receiving signals from wireless devices 22, and the positioning processing circuit 34 is operatively associated with the communication interface 30. The positioning processing circuit 34 is not necessarily configured to perform actual positioning calculations for wireless devices 22. Instead, it is referred to a "positioning" related circuit because it is configured to support activation of the cooperative positioning mode by given wireless devices 22, according to the teachings herein. For brevity, it is referred to hereafter as the "processing circuit 34."

In an example configuration, the processing circuit 34 is configured to detect a warning situation that is associated with actual or expected impaired operation of the wireless communication network 10 within a service area 18, identify wireless devices 22 in the service area 18 that are candidates for operating in a cooperative positioning mode for performing device positioning, and sending a message to the identified wireless devices 22, to activate the cooperative positioning mode. As noted, the cooperative positioning mode relies on exchanging positioning information between respective wireless devices 22 using D2D communications. Thus, cooperative positioning mode operation offers distinct advantages in reliability and/or accuracy as compared to use of an infrastructure-based positioning mode which may not work well, or work at all, in the presence of network impairment.

Figure 3:
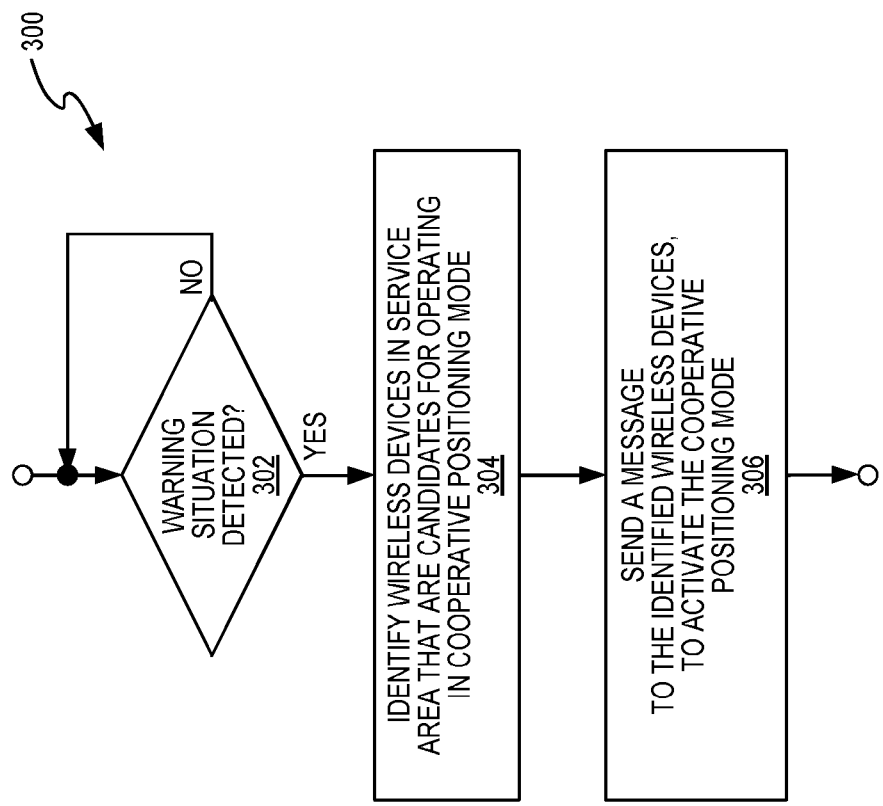
FIG. 3 is a logic flow diagram of one embodiment of a method of processing as taught herein for a network node.

FIG. 3 illustrates an embodiment of a method 300 that corresponds to the above-described processing for the base station 20. However, it will be appreciated that this functionality can be implemented at other types of network nodes, e.g., adapted for operation in one or more CN nodes, or one or more dedicated nodes may be added to carry out such functionality, e.g., based on propagating signaling toward the wireless devices 22 via the base stations 20.

In one example, the network node in question can be a positioning node such as E-SMLC in LTE, which is configured for operation in a wireless communication network (10). During such operation, the example E-SMLC detects a warning situation, identifies wireless devices (22) in a service area (18) that are candidates for operating in a cooperative positioning node for performing device positioning and sends a message to the identified wireless devices (22), to activate the cooperative positioning mode. The positioning node may detect the warning situation for example based on information received from a wireless device or any other node, e.g. a MME, or a warning content provider, etc. The positioning node may identify the wireless devices (22) that are candidates for operating in a cooperative positioning mode based on at least one of: received information from the wireless devices, historical data regarding wireless devices (22) that have operated in a cooperative positioning mode, or information received from another node, e.g. a MME, a serving base station, etc.

With these implementation variations in mind, the method 300 according to the illustrated example includes detecting (Block 302) a warning situation that is associated with actual or expected impaired operation of the wireless communication network 10, at least within a service area 18; identifying (Block 304) wireless devices 22 in the service area 18 that are candidates for operating in a cooperative positioning mode for performing device positioning, wherein the cooperative positioning mode relies on exchanging positioning information between respective wireless devices 22 using D2D communications; and sending (Block 306) a message to the identified wireless devices 22, to activate the cooperative positioning mode.

A few points regarding the method 300 will be helpful in understanding its operation and potential for variation without departing from the essence of these teachings. First, one or more of the illustrated method steps may be performed in a different order, or may be performed in parallel, or in a loop, and/or on an ongoing, background or continuing basis. For example, identifying the wireless devices 22 within a given service area 18 that are candidates for operating in the cooperative positioning mode may be an ongoing process. For example, with respect to any given wireless device 22, the network node may determine whether it is or is not a candidate for operating in the cooperative positioning mode as part of admission control, device registration, call setup, etc.

Also, the particular details of one or more of the illustrated method steps may depend on the nature of the wireless devices 22 at issue. For example, sending (Block 306) the message may comprise sending a warning situation indicator to the identified wireless devices 22, at least in cases where the identified wireless devices 22 are configured to autonomously activate the cooperative positioning mode responsive to receiving the warning situation indicator. Additionally, or alternatively, the sending step comprises sending an explicit command to the identified wireless devices 22, commanding the identified wireless devices 22 to activate the cooperative positioning mode. In at least one example, sending (Block 306) the message comprises sending a mode switching command to the identified wireless devices 22, commanding the identified wireless devices 22 to switch from the infrastructure positioning mode to the cooperative positioning mode in response to the mode switching command.

In other variations, the step of identifying (Block 304) the wireless devices 22 in the service area 18 that are candidates for operating in the cooperative positioning mode may be based on any one or more determinations. In one example, identifying which wireless devices 22 are candidates for operating in the cooperative positioning mode comprises determining which ones of them have D2D communications capability. However, while D2D communications capability is a requirement for cooperative positioning, a given wireless device 22 may have D2D communications capability and yet be unable to operate in the cooperative positioning mode.

For example, a wireless device 22 may support D2D communications but not support cooperative positioning. Thus, in an example embodiment, determining whether a wireless device 22 is a candidate comprises determining that the wireless device 22 is capable of operating in the cooperative positioning mode. This determination comprises, for example, receiving or otherwise inspecting device capability information that explicitly or implicitly indicates that the wireless device 22 at least has the capability of operating in the cooperative positioning mode—e.g., some baseline cooperative positioning capability. Such capability information can be indicated in conjunction with or separately from an indication of D2D communication capability. Further, such capability information may indicate particular configurations and/or limitations regarding the device's cooperative positioning capabilities and identifying the wireless device 22 as being a candidate may depend on assessing the particular configuration or capability details.

In another variation, it is recognized herein that a given wireless device 22 is not necessarily a candidate for operating in the cooperative positioning mode even when it is known that the wireless device 22 is capable of cooperative positioning. As an example, at least where permitted by law, the device owner may be permitted to disable or otherwise disallow the wireless device 22 to perform cooperative positioning, e.g., out of concerns for personal privacy, battery life, etc. Thus, in at least some embodiments, determining whether a given wireless device 22 is a candidate for operating in the cooperative positioning mode comprises determining whether the wireless device 22 has an operational configuration that permits such operation. To this end, configuration information received from/for the wireless device 22 may include, e.g., a flag, an information element, or some other form of indicator that indicates that cooperative positioning operation is permitted.

Any one or more of such candidacy determinations are based on, for example, the network node receiving capability information from wireless devices 22 at call setup and/or at other times. In a minimal case, the capability information received for an individual wireless device 22 indicates whether or not that device is capable of D2D communications. Additionally, or alternatively, the capability information indicates whether the wireless device 22 has cooperative positioning capability. Still further, the network node may determine candidacy based on receiving information indicating that the wireless device 22 is permitted to operate in a cooperative positioning mode.

Broadly, it is recognized herein to use information received from, or otherwise known for, given wireless devices 22, to determine which ones of those wireless devices 22 should be considered as candidates for operating in a cooperative positioning mode. At least some such information may be known based on the network node receiving capability and/or operational configuration information from such wireless devices 22, or from another network node such as a core network node (e.g., an MME) or a serving base station. For example, for a given wireless device 22, the network node may evaluate capability information that indicates D2D and/or cooperative positioning capabilities of the device. The device may be deemed a candidate or not on that basis. However, the network node may also evaluate operational configuration information. Consider the case where the capability information indicates that the device has the capability of operating in a cooperative positioning mode, but operational configuration information for the device indicates that cooperative positioning is not permitted. In this case, the network node would not deem the device as a candidate. Such indications may be explicit or implicit.

With these points of flexibility in mind, the network node identifies the wireless devices 22 in a service area 18 that are candidates for operating in a cooperative positioning mode by determining which wireless devices 22 in the service area 18 at least have D2D communications capability. This candidacy determination may include, or may be extended, by the network node determining which wireless devices 22 at least have the capability of supporting cooperative positioning. Still further, the candidacy determination may include, or may be extended, by the network node determining which wireless devices 22 are permitted or willing to operate in the cooperative positioning mode. Thus, there may be a set of devices having D2D capability, a potentially smaller set of devices having D2D and cooperative positioning capabilities, and potentially smaller set of devices having D2D and cooperative positioning capabilities and further having operational configurations that permit cooperative positioning. Any and all such determinations may be based on the network node receiving capability information and/or operational configuration information for individual ones of the wireless devices 22 in the service area 18.

Turning to other aspects of the method 300, it will be appreciated that the wireless communication network 10 uses certain radio resources for communicating with wireless devices 22. Correspondingly, the method 300 may include the base stations 20 or other network nodes reserving a portion of the radio resources, for use in cooperative positioning using D2D communications. In other words, the network 10 may advantageously set aside a portion of its radio resources, for use in cooperative positioning operations. As such, the method 300 in one or more embodiments also includes the base stations 20 or other network nodes indicating the reserved portion of the radio resources to the identified wireless devices 22, either in advance of or in conjunction with sending the message. The indication may be sent to all wireless devices 22, e.g., via general broadcast, or may be sent only to those wireless devices 22 identified as candidates for operating in the cooperative positioning mode.

In another example of the variations and extensions of the method 300 contemplated herein, the method 300 may include sending (Block 306) the message as a warning situation severity indicator—e.g., a value taken from a severity scale or a value that indicates a particular type of warning situation. Examples of severity scale values are no warning, low warning, medium warning and high warning, which can be expressed using two bits of information. Examples of particular types of warning situations are fire, earthquake, flood, etc. A particular type of warning situation may represent an on-going event (e.g., fire) or an expected event (e.g., Tsunami). In one of the advantageous corresponding configurations contemplated for wireless devices 22, the wireless devices 22 are configured to decide whether or not to activate the cooperative positioning mode in dependence on the severity of the warning situation, as indicated by the warning situation severity indicator.

Still further, in at least some embodiments, the method 300 further includes sending signaling indicating the identified wireless devices 22—i.e., identifying the wireless devices 22 that have been identified as candidates for operating in the cooperative positioning mode. Such information is sent generally to all wireless devices 22 within the service area(s) 18, or is sent only to the identified wireless devices 22. In either case, it will be understood that such information is for use by individual ones of the identified wireless devices 22 in discovering other ones of the identified wireless devices 22, for engaging in cooperative positioning. For example, such information may include device identifiers, radio beacon information, etc., or other such information that will aid a given candidate wireless device 22 in finding other candidate wireless devices 22 that are proximate to it.

Figure 4:
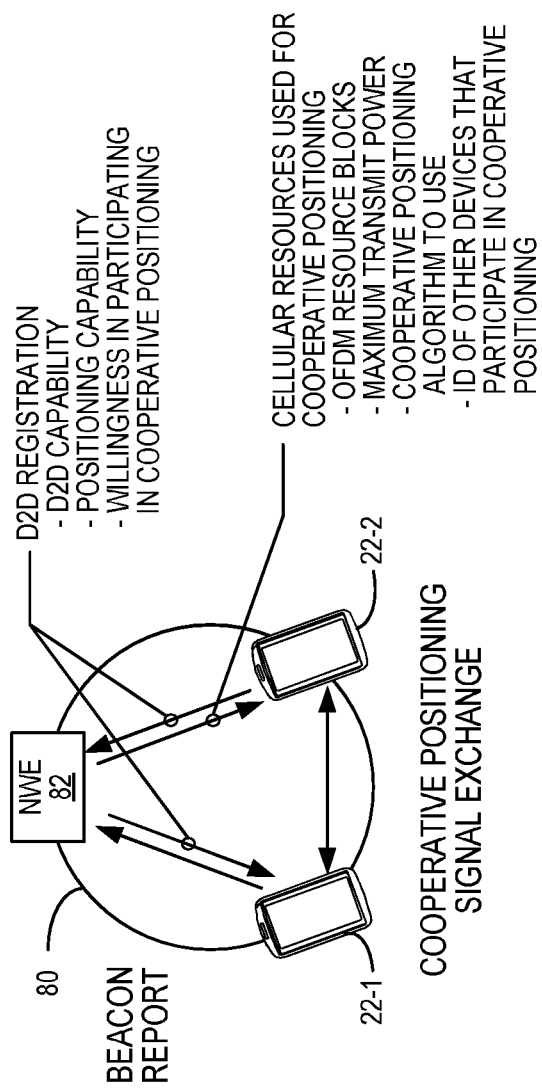
FIG. 4 is a diagram of example signaling and information exchanges, such as may be used in one or more embodiments of the teachings herein.

FIG. 4 illustrates a non-limiting example of such signaling. Here, one sees a generalized service area 80 and an associated network entity (NWE) 82 operating as an example of the base station 20 or other network node contemplated herein. The NWE 82 obtains a number of information items during, e.g., device registration, such as D2D capability information, positioning capability information, cooperative positioning capability information, willingness to participate in cooperative positioning, etc. The NWE 82 also broadcasts or otherwise transmits assistance information, e.g., as needed or on a periodic basis. This information includes, for example, an identification of the radio resources to be used by the wireless devices 22 for cooperative positioning, e.g., OFDM resource block reservations, time slots, subframes, maximum allowed transmit power, transport format (e.g., modulation and coding scheme) of data blocks used for transmission, multi-antenna transmission modes (e.g., transmit diversity), multi-antenna reception modes (e.g., receiver diversity, etc.)—which can help greatly in reducing the cooperative positioning signal search space for wireless devices 22 in an emergency. The NWE 82 also may provide other information, e.g., the maximum transmit power to be used in cooperative positioning, the cooperative positioning algorithm(s) that should be used, and the IDs of other wireless devices 22 that will or are expected to be available for cooperative positioning.

Now, with respect to the method 300, it will be appreciated that the illustrated base station 20 or other network node may be configured to carry out the method 300 based on the execution of computer program instructions. That is, the processing circuit 34 may be specially adapted to carry out the method 300, based at least in part on its execution of a computer program product recorded in a computer readable storage medium, such as the storage elements 36, which may comprise one or more memory circuits, such as FLASH, EEPROM or other non-volatile storage, along with SRAM, DRAM, or other working memory.

In one example, the computer program 40 shown by way of example in FIG. 3 comprises computer program instructions that, when executed by the processing circuit 34 to detect a warning situation that is associated with actual or expected impaired operation of the wireless communication network 10 within a service area 18; identify wireless devices 22 in the service area 18 that are candidates for operating in a cooperative positioning mode for performing device positioning; and send a message to the identified wireless devices 22, to activate the cooperative positioning mode.

Figure 5:
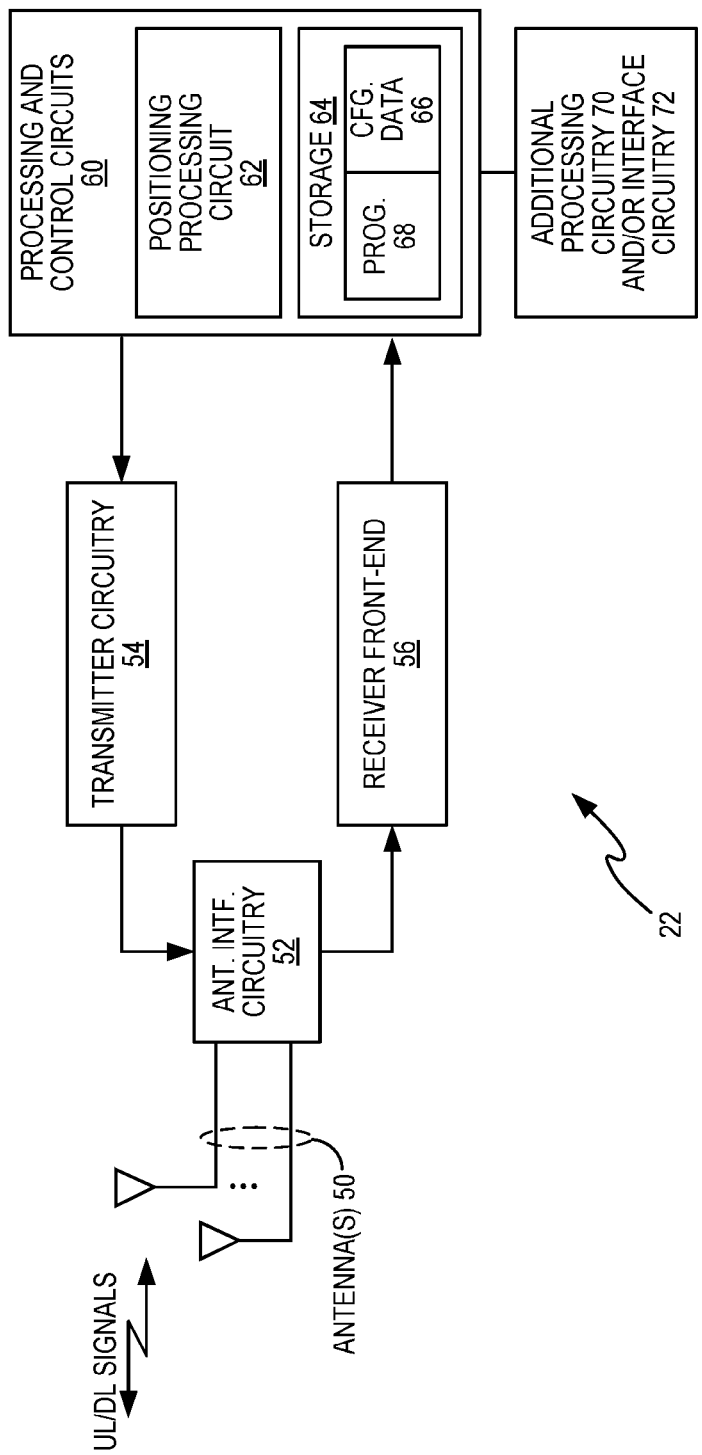
FIG. 5 is a block diagram of one embodiment of a wireless device, such as may be used in the wireless communication network introduced in FIG. 1.

FIG. 5 provides an example of device-side configuration details, wherein a wireless device 22 comprises one or more transmit/receive (TX/RX) antennas 50, for transmitting uplink (UL) signals to the wireless communication network 10, and for receiving downlink (DL) signals from the wireless communication network 10. Further, the example wireless device 22 includes antenna interface circuitry 52 coupling the antennas 50 with transmitter circuitry 54 and with a receiver front-end 56. The transmitter circuitry 54 includes, for example, at least the power amplifier (PA) circuitry and associated frequency controls needed for transmitting communication signals at the desired frequencies. Such circuitry may be driven by and controlled by baseband processing circuits, generally represented as processing and control circuits 60.

Similarly, the receiver front-end circuits 56 may be controlled by the processing and control circuits 60, which may comprise one or more microprocessors, microcontrollers, DSPs, ASICs, FPGAs, or other such digital processing circuitry. In an example case, the receiver front-end 56 includes filters, gain control circuitry, low-noise amplifiers, and down-conversion/digitization circuitry, as needed, to obtain time-varying streams of digital sample values corresponding to one or more antenna-received DL signals.

The processing and control circuits 60 at least functionally include a positioning processing circuit 62 and further includes or is associated with one or more storage elements 64, storing configuration data 66 and/or a computer program 68. Depending upon its sophistication and intended usage, the wireless device 22 may include any number of additional processing circuits 70 and/or interface circuitry 72—e.g., sensor interfaces, keypads, display screens, and/or other input/output circuits.

In more detail, in an example configuration, the antennas 50, antenna interface circuitry 52, transmitter circuitry 54 and receiver front-end 56 operate as a communication interface that is configured for sending signaling to and receiving signaling from the wireless communication network 10, and the positioning processing circuit 62 is operatively associated with the communication interface and is configured to: detect a warning situation that is associated with actual or expected impaired operation of the wireless communication network 10 within a current service area 18 of the wireless device 22; activate a cooperative positioning mode that relies on exchanging positioning information with other wireless devices 22 using D2D communications; detect one or more other wireless devices 22 in the service area 18 that are candidates for engaging in cooperative positioning with the wireless device 22; and perform cooperative positioning in conjunction with one or more of the detected wireless devices 22.

In at least one such embodiment, the one or more storage elements 64 store the computer program 68 as a computer program product recorded in a computer readable storage medium. The program 68 comprises computer program instructions that, when executed by the processing circuit 62, configure the wireless device 22 to perform the above-specified operations. As such, the processing circuit 62 can be understood as being specially adapted to carry out the device-side aspects of the teachings herein, based at least in part on its execution of stored computer program instructions.

Figure 6:
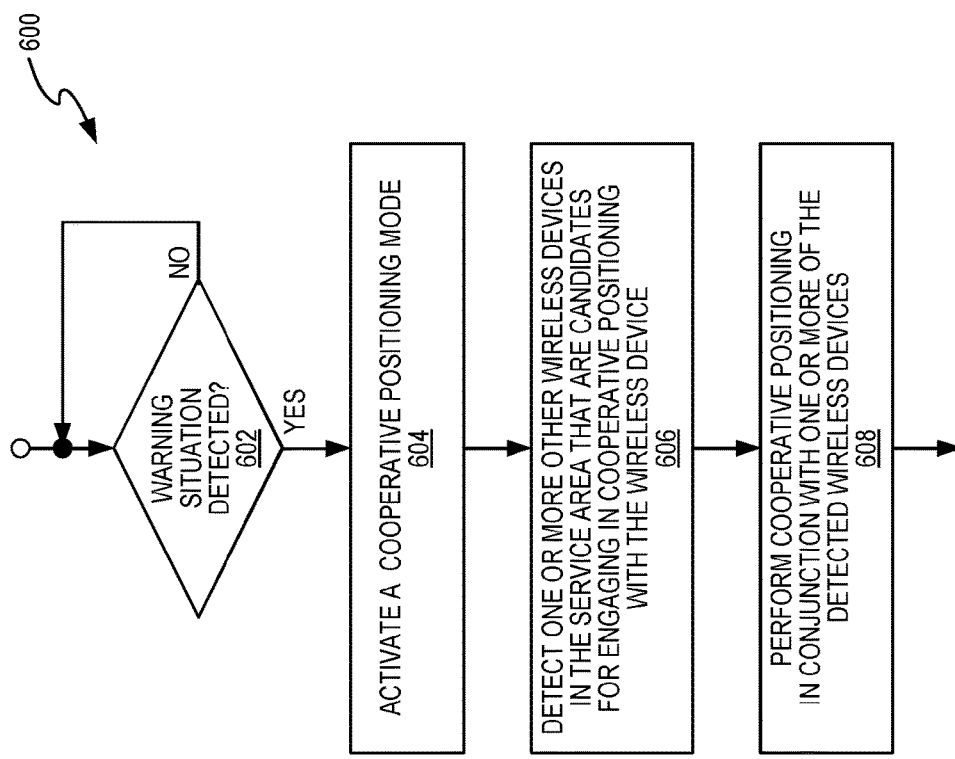
FIG. 6 is a logic flow diagram of one embodiment of a method of processing as taught herein for a wireless device.

More broadly, whether realized through the programmatic configuration of the processing circuit 62, or realized through fixed circuitry, or some combination of both, the example wireless device 22 is configured to carry out a method 600. In the illustrated example of FIG. 6, the method 600 includes: detecting (Block 602) a warning situation that is associated with actual or expected impaired operation of the wireless communication network 10 within a current service area 18 of the wireless device 22; activating (Block 604) a cooperative positioning mode that relies on exchanging positioning information with other wireless devices 22 using D2D communications; detecting (Block 606) one or more other wireless devices 22 in the service area 18 that are candidates for engaging in cooperative positioning with the wireless device 22; and performing (Block 608) cooperative positioning in conjunction with one or more of the detected wireless devices 22.

In one example, the method 600 includes the wireless device 22 receiving information from the wireless communication network 10 that identifies the candidate wireless devices 22. Here, the step of detecting in Block 606 comprises the wireless device 22 using the received information for discovering or otherwise identifying one or more of the candidate wireless devices 22. For example, it receives device IDs for the candidate wireless devices 22 and uses those IDs to detect beacon signals (aka broadcast signals, pilot signals, identifying signals, etc.) from such other devices. In support of such functionality, in one or more embodiments, the wireless device 22 sends information to the wireless communication network 10 that indicates that the wireless device 22 is a candidate for operating in the cooperative positioning mode.

In one such example, the method 600 also may include the wireless device 22 sending information to the wireless communication network 10 that indicates that the wireless device 22 is a candidate for operating in the cooperative positioning mode, where that sending operation comprises at least one of: sending information to the wireless communication network 10 that indicates that the wireless device 22 is a candidate for operating in the cooperative positioning mode comprises at least one of: sending information indicating that the wireless device 22 is at least capable of using D2D communications; sending information indicating that the wireless device 22 is at least capable of supporting cooperative positioning; and sending information indicating that the wireless device 22 is permitted or willing to perform cooperative positioning.

In other variations, the detecting operation in Block 602 comprises the wireless device 22 receiving a message from the wireless communication network 10 that includes a warning situation indicator. In this example case, the wireless device 22 is configured to perform the activation step in Block 604 autonomously—i.e., it activates the cooperative positioning mode in response to receiving the warning situation indicator.

In an alternative configuration, the detecting operation in Block 602 comprises receiving a message from the wireless communication network 10 that includes a command to activate the cooperative positioning mode. Here, the wireless device 22 is configured to activate the cooperative positioning mode in response to the command.

For example, detecting (Block 602) the warning situation comprises the wireless device 22 receiving a mode switching command from the wireless communication network 10, and switching from the infrastructure positioning mode to the cooperative positioning mode in response to the mode switching command. The warning may be, for example, any of: a message or command to activate D2D cooperative positioning; a message or command to abandon infrastructure based positioning; or a message or command (a combined command) to cover both options, i.e., activate cooperative positioning and abandon infrastructure based positioning.

In some embodiments, the detecting operation of Block 606 comprises detecting one or more other wireless devices 22 in the service area 18 that are at least capable of D2D communications. Of course, the wireless device 22 may constrain or refine its detecting operations using further information received from the network 10, e.g., limiting its detection to those other wireless devices 22 that were identified as candidates for cooperative positioning operation, based on having D2D communications capability and further having operational configurations that permitted their operation in the cooperative positioning mode.

For example, in revisiting FIG. 4, it may be that all user equipments (UEs) in a 3GPP network that are capable of and willing to participate in D2D based cooperative positioning groups, register at some NWE 82. As noted, the NWE 82 can be a radio node such as an eNB (in the case of active or connected mode UEs), or it can be a core network entity such as a Mobility Management Entity or MME, to allow the registration of idle mode UEs by using non access stratum (NAS) signaling for the purpose of registration.

The NWE 82 can also be a positioning node e.g. an E-SMLC supporting positioning in an LTE-based network. In this case, a given UE signals its capability information to the E-SMLC via the LTE Positioning Protocol. Alternatively, the positioning node can acquire the UE capability related to the cooperative positioning and/or the willingness to participate in D2D-based cooperative positioning groups from another node, e.g., an MME, a radio node, etc. The registration includes the identity of the UE (e.g. MSISDN), data about the UE's D2D capabilities, its Radio Access Technology (RAT) and frequency band capabilities, positioning capabilities and current navigational satellite access situation (e.g. current GPS signal strength/quality).

In turn, the NWE 82 maintains and continuously updates a database (DB) of UEs currently in the cell/registration/tracking area (TA) that are D2D capable. Here, the cell/registration/tracking area is an example of the earlier discussed service areas 18 and the database 38 introduced in FIG. 2 may be structured and maintained according to this example. In particular, the database 38 may contain information that is registered by the UEs themselves or that is fetched by the NWE 82 based on subscription data, which may be obtained based on MSISDNs of the UEs. Such information may indicate the location/positioning capabilities of such UEs, such as their GNSS/GPS capability, their support for E-CID or OTDOA based positioning, etc., along with possibly indicating supported RATs, frequencies, etc. The NWE 82 may then determine which UEs are candidates for performing cooperative positioning based on this information and/or may determine the particular cooperative positioning algorithm(s) to be used by such UEs.

In a further example of contemplated operation, the NWE 82 informs a UE, e.g., upon successful registration of the UE, about the other registered UEs that are candidates for cooperative positioning. The UE may be informed using any suitable protocol, e.g., via Radio Resource Control (RRC) signaling in the case of a connected-mode UE, or via NAS signaling in the case of an idle-mode UE, or by using the LTE Positioning Protocol (LPP) in the case that the NWE 82 is an E-SMLC.

Such signaling also may inform the UE about the cellular network resources (e.g. OFDM resource blocks) reserved for the exchange of data for the purpose of cooperative positioning, preferred RATs to use for future D2D communications, and other parameters that help the UEs to build up D2D links. Examples of other such parameters include the transmission power to use, the modulation and coding schemes to be used, etc. The NWE 82 also may track the current locations of the UEs and sends them valid information to assist cooperative positioning. For example, if a UE moves to a new location within the network, the NWE 82 sends information to that UE regarding the other UEs in that same area that are candidates for cooperative positioning.

In such a case, the NWE 82 (or another, cooperating NWE in the new area) may instruct the UE to disregard previous database information sent to it regarding candidate UEs. In general, it will be understood that the database 38 will correspond to a given service area 18 (or areas), and that it will be dynamically updated as UEs enter and exit the service area 18. Such updates may be transmitted to UEs within the service area 18 on an as-needed or periodic basis. Of course, one NWE 82 may maintain database information for multiple service areas 18, and arrange for the eNBs in each service area 18 to transmit the cooperative positioning database information applicable to that area.

In another example, the NWE 82 may configure each candidate UE with a duration (e.g., a timer value) up to which the recently sent database information for cooperative positioning remains valid. This duration may also be pre-defined, e.g. as a 10 minute timer. The NWE 82 also may configure candidate UEs with location information (e.g., geographic coordinate information) for the service area 18 corresponding to the most recently sent cooperative positioning database information. In turn, the UE may be configured to discard or ignore the database information if it detects or is told that it has moved out of the area in which such information applies. This location-based discarding may be combined with or complement the time-based discarding, in the interest of preventing the UE from using stale or inapplicable information.

As for the NWE 82 obtaining warning situation information, the NWE 82 in one or more embodiments uses existing technology to determine, sense and/or predict a disaster or public safety situation, and/or level of warning situation severity, possibly along with other information, such as earthquake level, location of earthquake, urgency, measured temperature and other sensor data. In particular examples, the NWE 82 obtains warning situation information from an ETWS or CMAC server, which may communicatively couple to the CN 14 introduced in FIG. 1 via an external network or via a private connection into the CN 14.

The NWE 82 may also determine or estimate the portions of network infrastructure that are affected by the disaster, or that are expected to be affected by the disaster. For example, the network contains pre-determined information about the location of different network nodes, their coverage areas, their robustness levels or reliability levels in terms of withstanding a disaster, etc., for different regions of the network. Certain infrastructure nodes may be capable of operating without any disruption or with partial disruption under floods, for example, whereas some other infrastructure nodes may be capable of operating without any disruption or with partial disruption under an earthquake and/or tsunami. The ability of certain network nodes to withstand a particular disaster also depends upon the level and/or duration of the disaster. Therefore, the NWE 82 may use any detailed information provided as part of warning situation information to estimate the involved portions of the network.

Complementing such operation, the NWE 82 also determines which UEs in the affected regions are D2D capable and/or which ones are permitted to operate in the cooperative positioning mode. Of course, such a determination may be done as a general step and in advance of detecting a warning situation and determining the affected network areas. The NWE 82 in any case may be configured to maintain a list of D2D UEs that are within an affected area—i.e., an area of known or expected infrastructure impairment—and to take action to insure that these D2D UEs activate cooperative positioning operations, to ensure continued, reliable positioning determinations.

In an example case, the NWE 82 reserves certain cellular resources in a given service area 18 and instructs the UEs in that area that are candidates for cooperative positioning to activate cooperative positioning, in response to determining that the service area 18 is impaired by a warning situation, or is expected to be impaired. In turn, these candidate UEs begin broadcasting beacon signals in which positioning capability information is encoded. Each such candidate UE therefore looks for the positioning beacon signals from neighboring candidate UEs, at least within the cellular resources known to be reserved for such usage.

In an example case, the NWE 82 takes such action only if the determined criticality level of a warning situation is above a threshold (e.g. severe). However, regardless of whether the NWE 82 uses severity levels, it may modify certain operations in the affected service areas once cooperative positioning is activated. For example, the NWE 82 may instruct the candidate UEs to switch to cooperative positioning method and stop using infrastructure based positioning for determining their position. Further, at least in cases where the NWE 82 is a positioning node, it may stop providing positioning assistance information (e.g., cease providing OTDOA assistance information, etc.) at least for the candidate UEs.

If the NWE 82 is a radio node, then it may stop providing any assistance information for infrastructure based positioning. In addition, it may also request that any associated positioning nodes stop providing assistance information for infrastructure based positioning, at least to the candidate UEs. Alternatively, a radio node operating as the NWE 82 may provide the information related to the affected D2D UEs and/or related to the obtained public safety situation. In both cases, the positioning node may stop providing assistance information for infrastructure based positioning to such UEs. Further, if a given candidate UE was using infrastructure based positioning before the activation of cooperative positioning mode, then the NWE 82 may explicitly instruct the UE to abandon infrastructure based positioning operations.

Still further, if the NWE 82 receives any UE positioning measurement results related to infrastructure based positioning methods and/or receives UE location information that was determined by any infrastructure based positioning method, then the NWE 82 may consider such positioning information as being unreliable as a consequence of the warning situation. As such, the NWE 82 may discard such positioning information, or it may use such information provided that the positioning determination is consistent with that obtained through cooperative positioning methods.

In cases where the NWE 82 uses or is aware of the criticality level of a given warning situation, it may send only an indication of the warning level and rely on the interpretation of that warning level indicator at the candidate UEs for the selective activation of cooperative positioning. For example, the NWE 82 sends the criticality level of the warning situation to the candidate UEs, e.g., pre-determined identifiers are sent, such as no warning=0, mild=1, severe=2, very severe=3.

In another embodiment, the NWE 82 sends the criticality level of the warning situation as above and also sends additional information associated with the warning situation. Examples of the additional associated information include: the type of warning (e.g. flood, hurricane, ETWS, etc.; the affected area in terms of geographic coordinates; the affected network nodes (e.g. cell identifiers such as Physical Cell Identity or PCI, Cell Global Identifier or CGI, etc.; the types of affected nodes, e.g., positioning server, eNBs (or base stations 20, more generally), CN nodes, relays, LMUs and other positioning-related nodes; timing related to the warning, e.g., a starting time, end time, event duration, etc. Note that such timing information can be given with respect to a reference time, e.g., a GNSS clock, the serving cell timing, an absolute timing, the time in a particular zone, e.g., Central European Time (CET), etc.

The NWE 82 may cease providing positioning assistance information for infrastructure based positioning by the affected candidate UEs, at least until the warning severity falls below a predetermined level. Of course, the NWE 82 also may inform the UEs when the warning level returns to a normal level or becomes less severe. In these and other cases, the signaling from the NWE 82 can be sent to specific UEs, e.g., using dedicated or group messages, or simply may be broadcast in a general sense.

The NWE 82 also may inform other network nodes (e.g. neighboring eNBs, positioning nodes, etc.) that certain UEs have been informed about the warning situation and additional information associated with the warning situation. The other network nodes may use this received information for several purposes. For example if any of them starts serving one of such UEs, then the new network node can avoid sending the same warning situation to that UE. In another example, if any of the other network nodes starts serving any such UE and the warning situation changes, then the new serving node can send the updated information about the warning situation to the UE.

As for UE-taken actions, in at least one example configuration, a UE is configured to autonomously activate cooperative positioning mode, in response to receiving a message from the NWE 82—e.g., the UE may be configured to stop using infrastructure based positioning and to begin using cooperative positioning in response to receiving a warning situation indication or command from the NWE 82. The UE may be required to switch to the cooperative positioning method within a pre-defined time period, timed from the moment it receives the message containing the warning related information or within a time T0 (e.g., 500 ms) from the start of the warning situation.

The autonomous decision to switch between positioning methods can be based on pre-determined rule(s). In an example configuration, a UE is configured to follow the rule that it shall use cooperative positioning if the warning situation criticality level is above a threshold and/or if the warning is of certain type e.g. earthquake, etc. The UE also may be configured to inform the network that it has switched to the cooperative positioning mode for determining its location. The UE also may forward the information about the warning situation to other candidate UEs and, in turn, these other candidate UEs may use the received information for deciding whether to use cooperative positioning or infrastructure based positioning (or neither mode), depending upon the severity level of the warning situation.

Of course, UEs also may be configured to detect warning situations without receiving information from the network. In such configurations, a UE that can perform cooperative positioning autonomously obtains information related to the criticality level of the warning situation and based on this obtained information it autonomously switches to cooperative positioning. However, the NWE 82 may have pre-configured the UE with information that assists the UE in switching to cooperative positioning. For example, the NWE 82 may provide the candidate database information discussed earlier, to aid in the discovery of other candidate UEs after activation of the cooperative positioning mode.

In an example case, a given UE detects a warning situation based on user input, or based on monitoring radio, TV, Emergency Broadcast System (EBS) signals, or other such monitoring. In another example, the UE may include or be associated with one or more sensors (e.g., seismic, smoke, etc.) that enable detection of at least some types of warning situations. In another example, the UE assumes that a warning situation exits based upon its detection of a full or partial loss in network functionality—e.g., the detection of downlink signal disruptions in a given number of network cells. In yet another example, the UE assumes that a warning situation applies in response to detecting excessive errors in infrastructure based positioning results.

However, in embodiments that use a more "network aware" approach, the UE may be provided with richer information. For example, the NWE 82 (or multiple NWEs 82 cooperating together) may transmit signaling that indicates the particular areas of the network in which cooperative positioning should be used, and may indicate other areas where infrastructure based positioning should be used, or where such positioning is at least available and reliable. The NWE(s) 82 also may send signaling that identifies specific nodes within the network that are affected by actual or expected impairment. In such cases, a UE may not activate cooperative positioning unless it determines that its current mode of positioning involves an affected node.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method in a network node configured for operation in a wireless communication network, said method comprising:
    identifying wireless devices in the service area that are candidates for operating in a cooperative positioning mode for performing device positioning, wherein the cooperative positioning mode relies on exchanging positioning information between respective wireless devices using device-to-device (D2D) communications; and
    sending assistance information to one or more of the identified wireless devices, to assist inter-device discovery when activating the cooperative positioning mode;
    wherein identifying the wireless devices in the service area that are candidates for operating in the cooperative positioning mode comprises determining which wireless devices in the service area at least have D2D communications capability.

2. The method of claim 1, further comprising detecting a warning situation that is associated with actual or expected impaired operation of the wireless communication network, at least within a service area and sending a warning situation indicator to the identified wireless devices, and wherein the identified wireless devices are configured to activate the cooperative positioning mode autonomously based on the assistance information, responsive to receiving the warning situation indicator.

3. The method of claim 1, further comprising detecting a warning situation that is associated with actual or expected impaired operation of the wireless communication network, at least within a service area, and an explicit command to the identified wireless devices, commanding the identified wireless devices to activate the cooperative positioning mode.

4. The method of claim 1, wherein identifying the wireless devices in the service area that are candidates for operating in the cooperative positioning mode further comprises determining which wireless devices at least have cooperative positioning capability.

5. The method of claim 1, wherein identifying the wireless devices in the service area that are candidates for operating in the cooperative positioning mode further comprises determining which wireless devices are permitted or willing to operate in the cooperative positioning mode.

6. The method of claim 1, wherein determining which wireless devices in the service area at least have D2D communications capability comprises receiving capability information and/or operational configuration information for individual ones of the wireless devices in the service area.

7. The method of claim 1, wherein the wireless communication network uses radio resources for communicating with wireless devices, and further comprising reserving a portion of the radio resources for use in cooperative positioning using D2D communications and indicating the reserved portion of the radio resources in the assistance information.

8. The method of claim 1, wherein the assistance information indicates at least one of a device identifier and radio beacon information, for one or more of the identified wireless devices, to aid discovery by given other ones of the identified wireless devices, for cooperative positioning.

9. The method of claim 1, further comprising detecting a warning situation that is associated with actual or expected impaired operation of the wireless communication network, at least within a service area and sending a warning situation severity indicator, thereby enabling the identified wireless devices to decide whether or not to activate the cooperative positioning mode in dependence on the severity of the warning situation as indicated by the warning situation severity indicator.

10. The method of claim 1, further comprising detecting a warning situation that is associated with actual or expected impaired operation of the wireless communication network, at least within a service area and sending any of a warning situation indicator, a warning situation severity indicator, or an explicit command to the identified wireless devices, commanding the identified wireless devices to abandon use of, or otherwise not use, infrastructure based positioning operations.

11. The method of claim 1, further comprising detecting a warning situation that is associated with actual or expected impaired operation of the wireless communication network, at least within a service area and sending a mode switching command to the identified wireless devices, commanding the identified wireless devices to switch from the infrastructure positioning mode to the cooperative positioning mode in response to the mode switching command.

12. The method of claim 1, wherein the assistance information indicates the identified wireless devices, for use by individual ones of the identified wireless devices in discovering other ones of the identified wireless devices, for engaging in cooperative positioning.

13. A network node configured for operation in a wireless communication network and comprising:
a communication interface configured for sending signals to wireless devices and receiving signals from wireless devices; and
a processing circuit that is operatively associated with the communication interface and is configured to:
identify wireless devices in the service area that are candidates for operating in a cooperative positioning mode for performing device positioning, wherein the cooperative positioning mode relies on exchanging positioning information between respective wireless devices using device-to-device (D2D) communications; and
send assistance information to one or more of the identified wireless devices, to assist inter-device discovery when activating the cooperative positioning mode;
wherein the processing circuitry is configured to identify the wireless devices in the service area that are candidates for operating in the cooperative positioning mode by determining which wireless devices in the service area at least have D2D communications capability.

14. The network node of claim 13, wherein the network node comprises a radio base station configured to provide radio service within the service area, the communication interface comprises radio transceiver circuitry configured to transmit downlink signals to and receive uplink signals from wireless devices in the service area, and further comprises one or more network communication interfaces for communicating with other radio base stations and/or with other nodes in the wireless communication network.

15. A non-transitory computer readable storage medium storing a computer program product comprising computer program instructions that, when executed by a processing circuit in a network node that is configured for operation in a wireless communication network, causes the network node to:
identify wireless devices in the service area that are candidates for operating in a cooperative positioning mode for performing device positioning, wherein the cooperative positioning mode relies on exchanging positioning information between respective wireless devices using device-to-device (D2D) communications; and
send assistance information to one or more of the identified wireless devices, to assist operation in the cooperative positioning mode;
wherein the network node identifies the wireless devices in the service area that are candidates for operating in the cooperative positioning mode by determining which wireless devices in the service area at least have D2D communications capability.

16. A method in a network node configured for operation in a wireless communication network, said method comprising:
identifying wireless devices in the service area that are candidates for operating in a cooperative positioning mode for performing device positioning, wherein the cooperative positioning mode relies on exchanging positioning information between respective wireless devices using device-to-device (D2D) communications; and
sending assistance information to one or more of the identified wireless devices, to assist inter-device discovery when activating the cooperative positioning mode;
wherein the wireless communication network uses radio resources for communicating with wireless devices, and the method further comprises reserving a portion of the radio resources for use in cooperative positioning using D2D communications and indicating the reserved portion of the radio resources in the assistance information.

17. A network node configured for operation in a wireless communication network and comprising:
a communication interface configured for sending signals to wireless devices and receiving signals from wireless devices; and
a processing circuit that is operatively associated with the communication interface and is configured to:
identify wireless devices in the service area that are candidates for operating in a cooperative positioning mode for performing device positioning, wherein the cooperative positioning mode relies on exchanging positioning information between respective wireless devices using device-to-device (D2D) communications; and send assistance information to one or more of the identified wireless devices, to assist inter-device discovery when activating the cooperative positioning mode;

wherein the wireless communication network uses radio resources for communicating with wireless devices, and the processing circuitry is further configured to reserve a portion of the radio resources for use in cooperative positioning using D2D communications and indicate the reserved portion of the radio resources in the assistance information.

\* \* \* \* \*